(12) United States Patent
Pajic (10) Patent No.: US 8,667,904 B2
(45) Date of Patent: Mar. 11, 2014

(54) AIRCRAFT TRAY TABLE WITH ELECTRONIC DEVICE SUPPORT

(71) Applicant: Nick Pajic, Phoenix, AZ (US)

(72) Inventor: Nick Pajic, Phoenix, AZ (US)

( * ) Notice: Subject to any disclaimer, the term of this patent is extended or adjusted under 35 U.S.C. 154(b) by 0 days.

(21) Appl. No.: 13/644,382

(22) Filed: Oct. 4, 2012

(65) Prior Publication Data

US 2013/0327255 A1 Dec. 12, 2013

Related U.S. Application Data

(60) Provisional application No. 61/641,098, filed on May 1, 2012, provisional application No. 61/546,969, filed on Oct. 13, 2011.

(51) Int. Cl.
*A47B 23/00* (2006.01)

(52) U.S. Cl.
USPC .................. 108/44; 297/146; 108/43; 108/25

(58) Field of Classification Search
USPC .......... 108/44, 42, 152, 1, 8, 9, 50.01, 25, 26, 108/151; 297/146, 163, 170, 173, 188.04
See application file for complete search history.

(56) References Cited

U.S. PATENT DOCUMENTS

| | | | | |
|---|---|---|---|---|
| 2,132,279 | A * | 10/1938 | Wicknick et al. | 297/146 |
| 2,619,395 | A * | 11/1952 | Kent | 108/38 |
| 3,795,422 | A * | 3/1974 | Robinson et al. | 297/146 |
| 5,092,652 | A * | 3/1992 | Macaluso | 297/146 |
| 5,970,884 | A * | 10/1999 | Taille et al. | 108/44 |
| 6,394,002 | B1 * | 5/2002 | Blanchard et al. | 108/44 |
| 7,104,599 | B2 * | 9/2006 | Berger et al. | 108/44 |
| 7,207,540 | B2 * | 4/2007 | Thomas | 248/346.01 |
| 7,971,929 | B2 * | 7/2011 | Kennard et al. | 297/146 |
| 8,287,022 | B2 * | 10/2012 | Decorme et al. | 296/24.44 |
| 2003/0217673 | A1* | 11/2003 | Berger et al. | 108/44 |
| 2007/0283855 | A1* | 12/2007 | Pozzi | 108/44 |

* cited by examiner

*Primary Examiner* — Jose V Chen
(74) *Attorney, Agent, or Firm* — Lightbulb IP, LLC

(57) ABSTRACT

A tray table having a support for portable electronic devices increases passenger convenience and comfort on flights. The support may comprise an elongated cavity configured to accept one or more portable electronic devices. The portable electronic devices may be held at various viewing angles relative to the passenger. In some embodiments, the passenger may be permitted to adjust the angle at which his or her portable electronic device is positioned.

16 Claims, 8 Drawing Sheets

AIRCRAFT TRAY TABLE WITH ELECTRONIC DEVICE SUPPORT

CROSS-REFERENCE TO RELATED APPLICATION

This application claims priority to U.S. Provisional Patent Application No. 61/641,098 titled Aircraft Tray Table with Electronic Device Support, filed May 1, 2012, and to U.S. Provisional Patent Application No. 61/546,969 titled Lightweight Electronic Tray Table, filed Oct. 13, 2011.

BACKGROUND OF THE INVENTION

1. Field of the Invention

The invention relates to inflight entertainment, and in particular to an aircraft tray table with electronic device support.

2. Related Art

Airplane tray tables have been largely unchanged for decades. In general, such tray tables move between a stowed upright position and a service position where a tray table is generally horizontal so that items may be supported by the tray table. In the service position, the tray table may be used to support food, drink, and other items for a passenger. Though positioned directly in reach of a passenger, traditional tray tables are limited to such functionality.

From the discussion that follows, it will become apparent that the present invention addresses the deficiencies associated with the prior art while providing numerous additional advantages and benefits not contemplated or possible with prior art constructions.

SUMMARY OF THE INVENTION

A tray table having a support for various electronic devices is disclosed herein. As will be detailed herein, the tray table's support allows passengers to easily secure portable or other electronic devices during a flight at ideal viewing or use positions. In this manner, entertainment or other services may be enjoyed while preserving passenger comfort. In addition, the support is highly versatile in that it is configured to accept various electronic devices and even multiple electronic devices at once. In some embodiments, the support may be passenger adjustable to allow passengers of different heights and having different preferences to position portable electronic devices as they desire.

Various configurations for the tray table have been disclosed herein. For example, in one embodiment a tray table for an aircraft passenger seat is disclosed. Such a tray table may comprise a planar body having a top surface for supporting one or more items, and a support formed by an elongated cavity in the planar body. The cavity may comprise a front wall, a back wall, two sidewalls, and a bottom. At least the back wall may be angled toward a back end of the tray table. This allows the support to hold a portable (or other) electronic device at an angle. One or more mounting structures may be at the back end of the tray table to secure the tray table to an aircraft passenger seat.

The support may be at the back end of the tray table, and there may be one or more openings in the bottom of the cavity to allow dirt or debris to exit the support. It is contemplated that the cavity may have an "L" shaped cross section to guide dirt and debris to exit at the back end of the tray table.

It is noted that the support may be rotatable within the body of the tray table in one or more embodiments. For example, the cavity may be in a rotatable assembly that allows passengers to position the cavity to a desirable angle, such that their portable electronic device is in a desirable or convenient angle for viewing or use according to their preferences. In such embodiments, the cavity may be rotated between an open and closed position. If not in use, the cavity may be placed in a closed position such as to prevent unwanted dirt or debris from entering the cavity.

A plug may be provided to cover the cavity to prevent entry of dirt or debris into the cavity. In addition, the tray table may comprise a first and second portion separable along the axis of the support to provide improved access to the cavity for cleaning or maintenance.

In another exemplary embodiment, an aircraft tray table with electronic device support is provided. Such an embodiment may comprise a body having a top surface for supporting one or more items, and a support comprising an elongated cavity in the top surface of the body. The cavity will typically extend laterally across the body and have an opening to receive an electronic device. A plug may be provided to enclose the opening of the cavity, and biasing mechanism may enclose the opening of the cavity by raising the plug to the top surface of the body while allowing the plug to be depressed when the electronic device is received in the cavity. Automatically enclosing the cavity when not in use, helps keep the cavity clean. In addition or alternatively, one or more openings may be at a bottom end of the cavity to allow dirt and debris to exit the support. One or more mounts may attach the aircraft tray table to one or more tray table support arms of an aircraft passenger seat.

It is noted that the aircraft tray table may comprise a first and second portion separable along the axis of the support to provide improved access to the cavity for cleaning or maintenance. In addition, the support may be rotatable within the body of the aircraft tray table to allow a passenger to select various viewing angles for his or her electronic device.

The aircraft tray table may also comprise an inductive battery charging system configured to wirelessly charge the electronic device. Also, one or more batteries may be secured within a compartment of the aircraft tray table for charging the electronic device. The one or more batteries may be removable from the aircraft tray table.

Various methods of providing inflight entertainment with an aircraft tray table are disclosed herein as well. For instance, in one embodiment, such a method may comprise providing a tray table at one or more passenger seats, with the tray table comprising a support comprising an elongated cavity extending laterally across the tray table and the cavity formed in a top surface of the tray table.

The exemplary method also includes receiving an electronic device in the cavity, supporting the electronic device at a non-perpendicular angle relative to the top surface of the tray table, and providing access to inflight entertainment to a passenger via the electronic device. The electronic device may be supported at various non-perpendicular angles selected by the passenger. The cavity may be enclosed with a plug when the electronic device is removed from the cavity. In addition, the electronic device may be inductively charged by the tray table.

A first portion of the tray table may be separated from a second portion of the tray table at the support to clean or maintain an interior portion of the support. Alternatively or in addition, a first portion of the tray table may be folded relative to a second portion of the tray table at the support to clean or maintain an interior portion of the support.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the tray table herein provides a versatile support for one or more portable electronic devices. As will be described further below, the tray table may be configured to hold portable electronic devices of various shapes and sizes. This is advantageous in that it allows passengers to enjoy use of their personal electronic devices during a flight. For example, passengers may access and enjoy various media or other inflight entertainment via their electronic devices during a flight. Using the tray table, passengers avoid having to hold, prop up, or otherwise secure their electronic devices in unorthodox ways, such as by leaning the devices against various surfaces at their seats. In addition, the tray table increases passenger comfort by holding portable electronic devices in an ergonomic position. In some embodiments, as will be described further below, the tray table's support may be rotatable or movable to allow adjustments to the position of a portable electronic device.

Figure 1A:
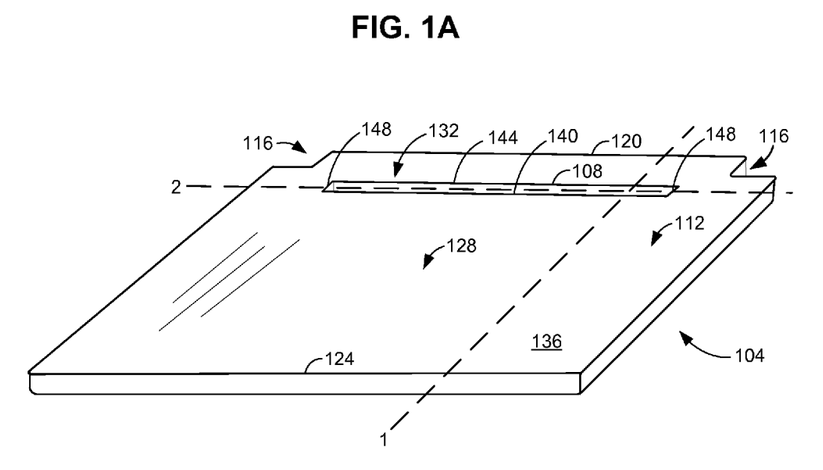
FIG. 1A is a top perspective view of an exemplary tray table with support.

FIG. 1A provides a top perspective view of an exemplary tray table 104 having a support 108 for portable electronic devices. As can be seen, the tray table 104 provides a planar top surface 112 that passengers may place their various items on. The tray table 104 may also include one or more mounting points 116 or mounts that allow it to be installed in an aircraft, such as on a back portion an aircraft passenger seat. In typical embodiments, the tray table 104 will mount to the rotatable tray table support arms of aircraft passenger seats. Mounting points may be at or near a back end 120 of the tray table 104. The mounting points 116 will typically allow the tray table 104 to rotate or otherwise move so as to allow the tray table to be moved between a stowed position (where it is secured to a seatback) and a service position (where it is substantially horizontal to support items on its top surface).

As can also be seen, the support 108 may be positioned at the back end 120 of the tray table 104. This allows the portion of the top surface 112 in front of the support 108 to be used even when the support 108 is in use. It is contemplated that the support 108 may be located at different locations as well. For instance, the support 108 may be near a front end 124 of the tray table 104, at a central portion 128, or elsewhere. Typically, the support 108 will extend laterally across the tray table 104 parallel to the back edge of the tray table, however it is contemplated that the support 108 may be angled slightly in some embodiments.

In one or more embodiments, the support 108 may be an excavated portion of the tray table 104 configured to accept a portable electronic device. For instance, the support 108 may be a cavity 132 formed in the body 136 of the tray table 104 for instance. The cavity 132 may comprise a front wall 140 and a back wall 144, and one or more sidewalls 148.

Figure 1B:
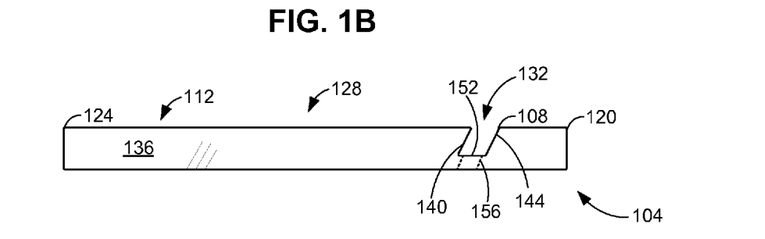
FIG. 1B is a cross sectional view of an exemplary tray table with support.
Figure 1C:
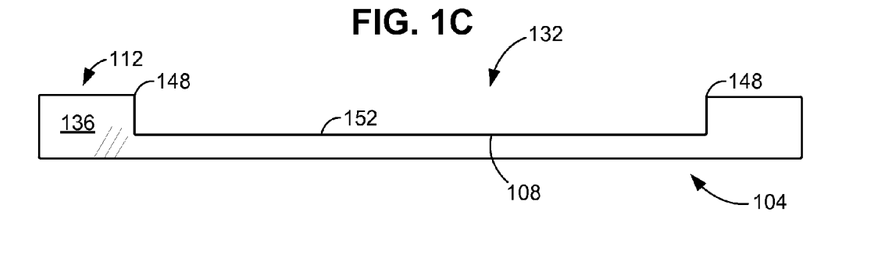
FIG. 1C is a cross sectional view of an exemplary tray table with support.

FIGS. 1B-1C provide cross sectional views of the tray table 104 and support 108. FIG. 1B is a cross sectional view across Line 1, while FIG. 1C is a cross sectional view across Line 2. As can be seen, the cavity 132 may have a bottom 152 to provide support to a portable electronic device thus preventing the device from sliding out of the support 108 through its bottom. It is noted that the bottom 152 may have one or more openings 156 to allow ventilation and to allow any spilled liquids or other debris to fall out of the support 108. This aids in keeping the support clean.

Figure 1D:
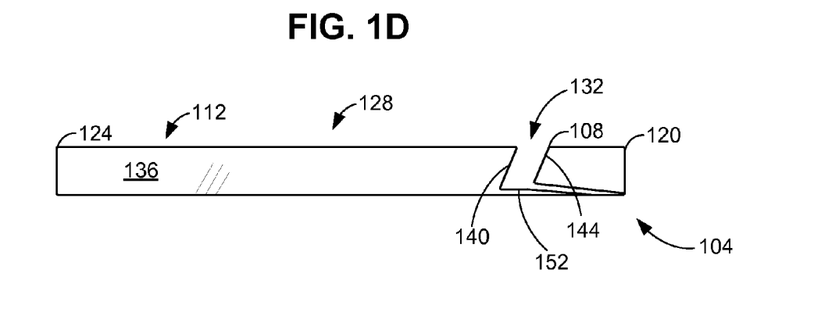
FIG. 1D is a cross sectional view of an exemplary tray table with support.

FIG. 1D illustrates a cross sectional view of an additional embodiment of the support 108. As can be seen, the cavity 132 may be "L" shaped thus providing a bottom 152 to support a portable electronic device. The lower portion of the "L" shape terminates at an opening near the back end of the tray table 104. This is advantageous in that it causes any fluids or other dirt/debris to flow toward the back of the tray table. In the event of a spill, such fluids would exit the tray table 104 away from the passenger as much as possible. It is noted that rather than forming the entire cavity 132 into an "L" shape, one or more channels/openings, could form the bottom of the "L" shape and guide dirt and debris toward the back of the tray table.

It is contemplated that a removable liner may be provided in some embodiments to aid in keeping the support clean. The liner may conform to the cavity 132 and may removed and replaced with a new liner when dirty. Alternatively or in addition, a plug, cap or other or covering may be provided to fill the cavity 132 to prevent dirt or debris from entering the support 108. Typically, the plug or cover would have a planar top positioned flush with the top surface 112 of the tray table 104, when inserted into the cavity 132. It is contemplated that the plug or cover may be affixed to the cavity 132 in some embodiments. For instance, the plug or cover may be a spring loaded or other biased mechanism that may be depressed downward to provide access to the cavity 132, thereby allowing an electronic device 204 to be inserted into the support 108. When not depressed, the biasing mechanism would raise the plug or cover such that it is flush with the top surface 112 of the tray table.

Referring to FIG. 1B, the support 108 may be angled in one or more embodiments. For instance, the support 108 may have a back wall 144 and/or front wall 140 that is at a non-perpendicular angle to the top surface 112 or body 136 of the tray table. As will be described further below, this allows the support 108 to hold a portable electronic device at an angle, which causes the device to face a seated passenger for ideal viewing. In one or more embodiments, the support 108 will be angled rearward towards the back end or edge of the tray table 104 to accomplish this.

It is contemplated that the cavity 132 may have various other cross sectional shapes as well. For example, the front wall 140 and back wall 144 may form a "V" or other shape that tapers from the top surface 112 of the tray table 104. This allows portable electronic devices of various thickness to be inserted into and securely held by the cavity 132. Alternatively or in addition, the cavity 132 may have a stepped cross section to produce a set of discrete widths between the front wall 140 and back wall 144. In other words, the front wall 140 and/or back wall 144 may be shaped like steps. This also allows portable electronic devices of various thicknesses to be supported by the cavity 132.

Figure 1E:
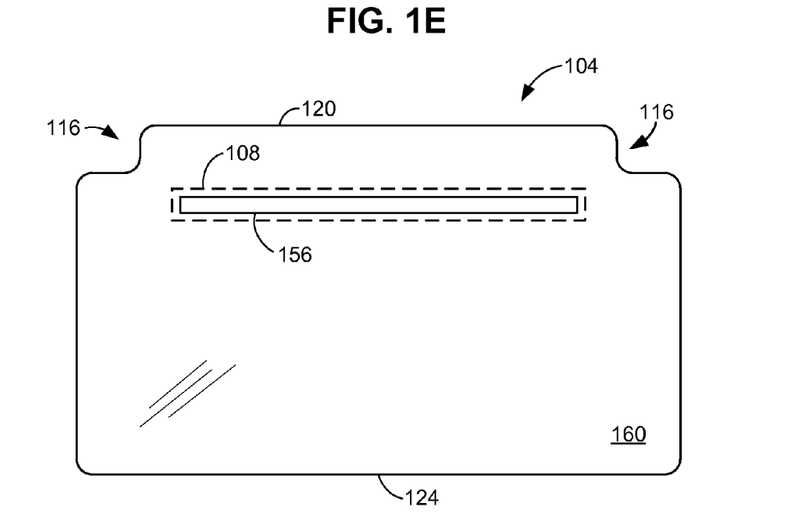
FIG. 1E is a bottom view of an exemplary tray table with support.

FIG. 1E is a bottom view of the tray table 104 showing the opening 156 which allows dirt and debris to exit the support 108. As can be seen, the opening 156 extends to the bottom surface 160 of the tray table 104 so that dirt and debris can fall out of the tray table 104. The opening 156 will typically be smaller than the cavity 132 so that an electronic device may be supported therein without falling through the opening. For example, the opening 156 may have a smaller width and/or length than the support 108. Though shown as a single opening 156 in FIG. 1E, it is contemplated that a plurality of openings may be used.

In addition, an opening 156 may be formed in various shapes and sizes. For example, an opening may have a length of 1-2 inches in some embodiments. This is advantageous in that such opening 156 is large enough to allow dirt and debris to escape while not being so large as to result in a smaller electronic device (such as a phone or other handheld device) to fall through the opening. In one or more embodiments, the bottom 152 of the support 108 may slant towards the opening 156 so as to guide dirt and debris toward the opening.

Figure 2:
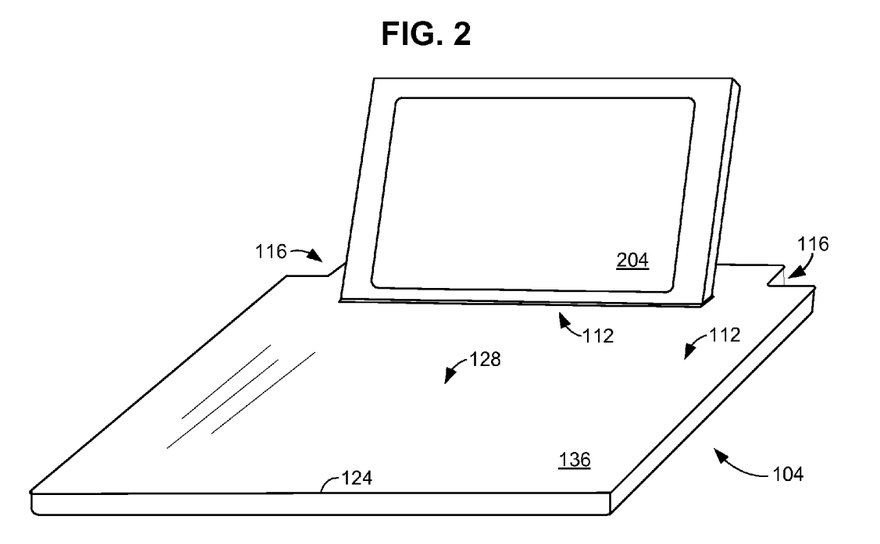
FIG. 2 is a perspective view of an exemplary tray table in operation.

FIG. 2 illustrates an exemplary tray table 104 having a portable electronic device 204 installed therein. As can be seen, the portable electronic device 204 may be held by the support 108 at a reclined angle, such as described above. It is contemplated that the support 108 may have a length selected to accommodate a variety of portable electronic devices. For instance, as can be seen from FIG. 2, the support 108 may accept a tablet device but also is sized to allow smaller devices, such as portable media players, smart phones, and portable gaming machines, to be held.

It is contemplated that the support 108 may be configured to provide connectivity to any device it is holding. For instance, the support 108 may have electrical, optical, or other terminals to provide power or data connections to a portable electronic device. In some embodiments, the support 108 may provide wireless connectivity to power or data connections. For example, the support 108 may provide inductive battery charging or a short-range data connection (such as a Bluetooth™ connection) to portable electronic devices. The tray table 104 may contain its own power source, such as one or more batteries, and/or may be connected to an aircraft's power system. The batteries may be rechargeable. In one or more embodiments, the batteries may be held in a compartment within the tray table 104 and be removable therefrom, such as for replacement, recharging, or both.

As disclosed above, the tray table may provide an adjustable support in some embodiments, such as to permit passengers to position their portable electronic devices at various angles. As will now be described with regard to FIGS. 3A-3C, the tray table 104 may include a rotatable assembly to allow such positioning.

Figure 3A:
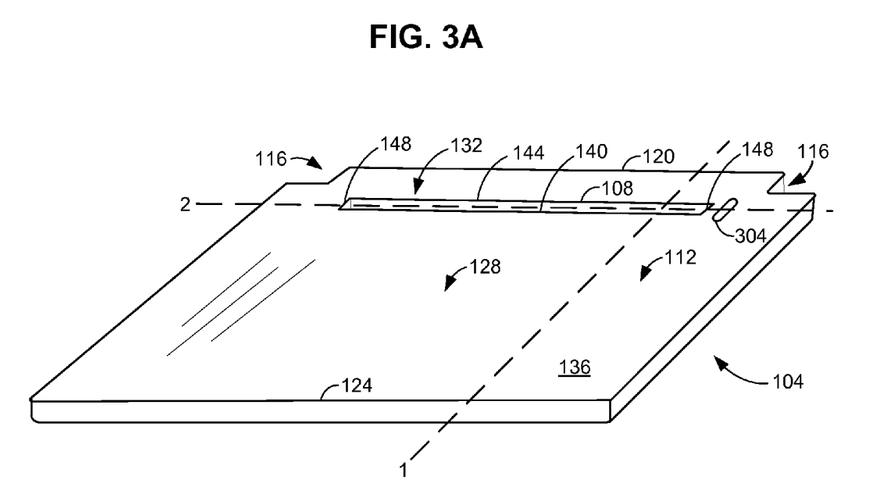
FIG. 3A is a top perspective view of an exemplary tray table with rotatable support.

FIG. 3A provides a top perspective view of the tray table 104. As can be seen, the outward appearance of an adjustable embodiment, may be similar to that disclosed above. In one or more embodiments, a control device 304 may be provided to allow the position of the support 108 to be changed. As shown, an adjustment wheel is provided as the control device 304. It is noted that various control devices, such as knobs, levers, sliders, buttons, or the like may be used to move the support 108. In addition, multiple control devices 304 may be provided. For instance an adjustment wheel or other control device 304 could be on both sides of the support 108 in some embodiments.

It is also noted that the support 108 may be biased (such as by one or more springs) in some embodiments. In this manner, the support 108 may be configured to automatically move or rotate to a particular position when a control device 304 is engaged, as will be described further below.

Figure 3B:
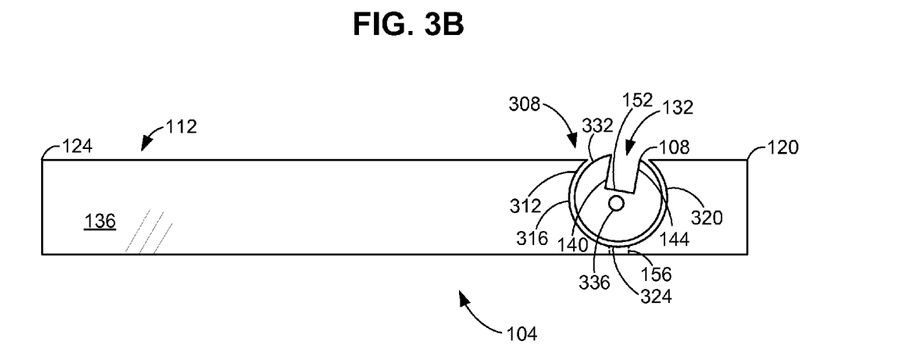
FIG. 3B is a cross sectional view of an exemplary tray table with rotatable support.

FIG. 3B provides a cross sectional view of the tray table across Line 1 of FIG. 3A. As can be seen the body 136 of the tray table 104 may be configured to accommodate a rotatable assembly 308. For example, as shown in the embodiment of FIG. 3B, a compartment 312 comprising a curved front and back wall 316, 320 configured to accept the rotatable assembly 308 while allowing the rotatable assembly to rotate or move within the compartment is provided. The compartment 312 may include a bottom 324 to enclose the rotatable assembly 308. An optional bottom 324 may be provided in some embodiments. It is noted that without a bottom 328, any dirt or debris that collects in the rotatable assembly 308 can be removed by rotating the assembly such that such debris can fall out of the assembly. Alternatively, and opening 156 may be formed in the bottom 324 of the compartment 312 to allow such dirt and debris to exit the assembly 308.

It is contemplated that the compartment 312 may extend from the top surface to the bottom surface of the tray table's body 136 in some embodiments. In this manner, the compartment 312 would have an opening at its top and bottom. This allows electronic devices to be received in the cavity 132 via the top opening of the compartment 312 while also allowing dirt and debris to exit the assembly via the bottom opening of the compartment. The body 332 of the rotatable assembly 308 may be sized to protrude from both the top and bottom opening of the compartment 312. In this manner, the body 332 itself forms a seal with the compartment 312 thereby preventing dirt and debris from entering the assembly 308.

The rotatable assembly 308 may comprise a body 332 having a cavity 132 therein to accept a portable electronic device. Similar to above, the cavity 132 may comprise a front wall 140, a back wall 144, and one or more sidewalls 148. A bottom 152 may be provided to prevent a portable electronic device from falling out of the cavity 132, such as described above. As can be seen, the cavity 132 may be angled to hold a portable electronic device at an angled position, such as described above. It is contemplated that the cavity 132 may be not be angled (i.e., be perpendicular to the axis of rotation) in some embodiments. With the rotatable assembly 308 for instance, a passenger may choose his or her desired angle by rotating the rotatable assembly. Thus, the cavity 132 itself may but need not be angled in all embodiments.

The body 332 or portion thereof of the rotatable assembly 308 may be rounded or cylindrical in one or more embodiments, such as to allow the rotatable assembly to rotate within the tray table 104. It is contemplated that the body 332 or portion thereof could have other cross sectional shapes. For example, the body 332 may be triangular, a pentagon, hexagon, or other shape. In some embodiments, the shape of the body 332 may be used to help hold the body 332 in position after it has been rotated. For example, the shape of the body may cause it to engage other surfaces of the tray table 104 thus holding the body in position.

One or more holding mechanisms may be used to hold the rotatable assembly 308 in a particular position. For example, a biased braking pad or other surface may press against the rotatable assembly 308 (such as at the body 332) to prevent the rotatable assembly from rotating out of a desired position. Other holding mechanisms, such as removable locking pins, detents, or the like could be used as well. In addition, it is contemplated that the body 332 may closely conform to its compartment 312 to hold itself in position once rotated to a desired position.

Figure 3C:
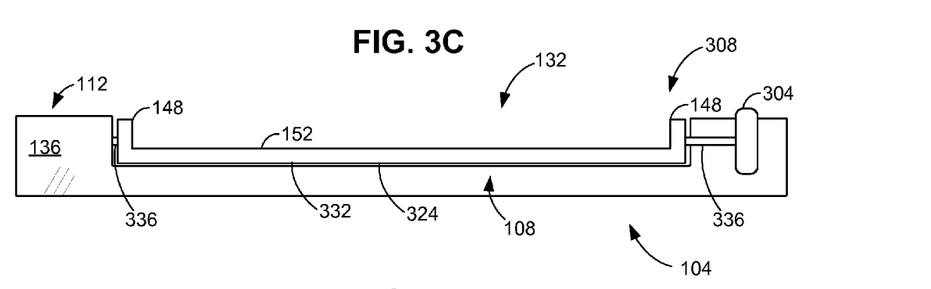
FIG. 3C is a cross sectional view of an exemplary tray table with rotatable support.

FIG. 3C illustrates a cross sectional view of the tray table 104 across Line 2 of FIG. 3A. As can be seen, the rotatable assembly 308 may comprise one or more axels 336 upon which its rotation may be accomplished. The axels 336 may extend to engage a portion of the rotatable assembly's compartment 312 to support the rotatable assembly 308 therein.

As shown in FIG. 3C, an axel 336 may also be mechanically linked to a control device 304 in one or more embodiments. In this manner, the axel 336 and thus the rotatable assembly 308 may be rotated by manipulating a control device 304. For example, in FIG. 3C rotating the control device 304 also rotates the rotatable assembly 308. It is noted that one or more biasing devices, such as springs, may engage or be attached to an axel 336 as well. This allows the rotatable assembly 308 to automatically move to a particular position when a biasing device is activated. For example, a biasing device may be configured to rotate the cavity 132 of the rotatable assembly 308 such that it is accessible from the top of the tray table 104. Alternatively, a biasing device could rotate the cavity 132 such that it is inaccessible, thus "closing" the support 108. This may be desirable to prevent unwanted dirt or debris from entering the cavity 132, such as during food service on a flight.

Figure 4A:
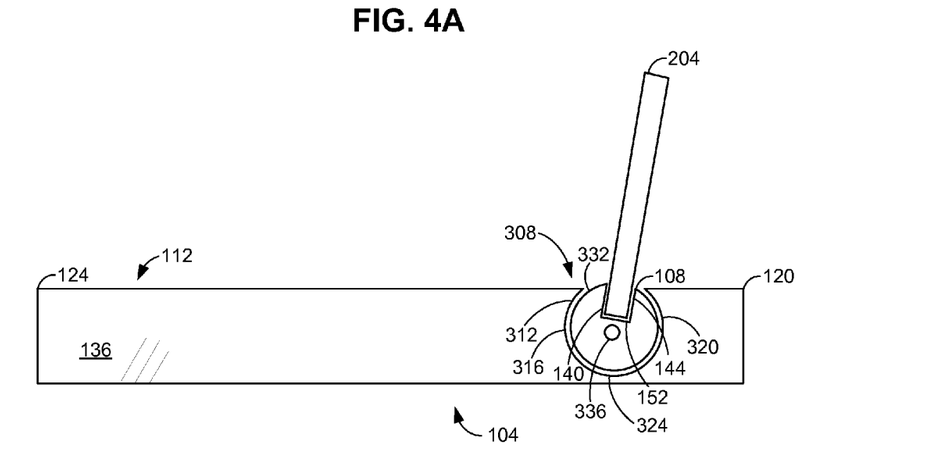
FIG. 4A is a cross sectional view of an exemplary tray table with rotatable support in operation.
Figure 4B:
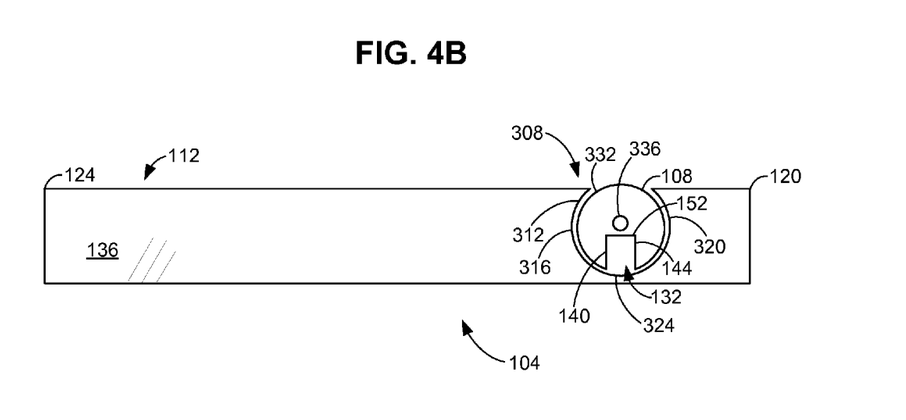
FIG. 4B is a cross sectional view of an exemplary tray table with rotatable support in operation.

FIGS. 4A-4B illustrate a rotatable assembly 308 in operation. As can be seen, the rotatable assembly 308 may rotate from the open position shown in FIG. 4A to the closed position shown in FIG. 4B. In the open position, the cavity 132 of the rotatable assembly 308 is typically accessible, thus allowing one or more portable electronic devices 204 to be supported therein, such as shown in FIG. 4A.

When not in use, the rotatable assembly 308 may be rotated to a closed position, such as shown in FIG. 4B. As can be seen, the cavity 132 may not be accessible when in the closed position. As stated, this prevents dirt or debris from entering the cavity 132. In embodiments where the tray table's compartment 312 has an open bottom, the rotatable assembly 308 may be rotated to empty any dirt or debris that may have collected therein. It is noted that the compartment 312 may have a removable bottom to allow this cleaning process to occur.

It is noted that the cavity 132 of the tray table 104 may be configured to protect any portable electronic devices it holds. For example, in one or more embodiments, the cavity 132 or portions thereof may be padded or be coated with non-abrasive surfaces to prevent the cavity from scratching or otherwise damaging the enclosure of a portable electronic device.

Figure 4C:
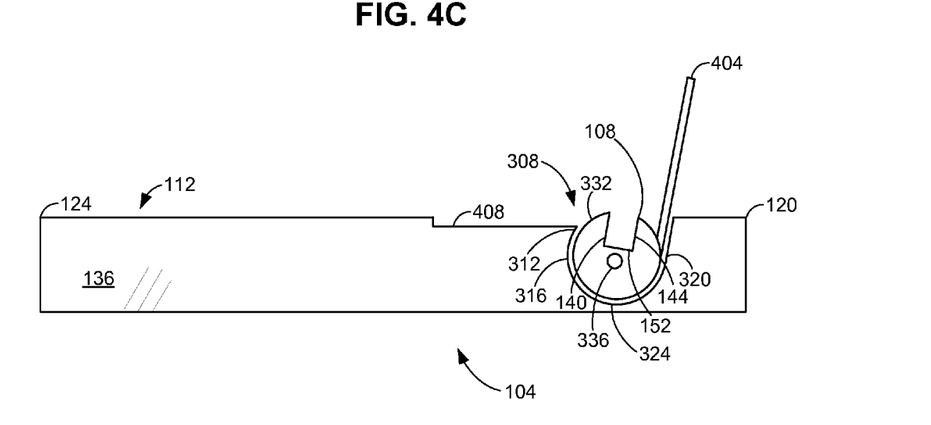
FIG. 4C is a cross sectional view of an exemplary tray table with rotatable support in operation.
Figure 4D:
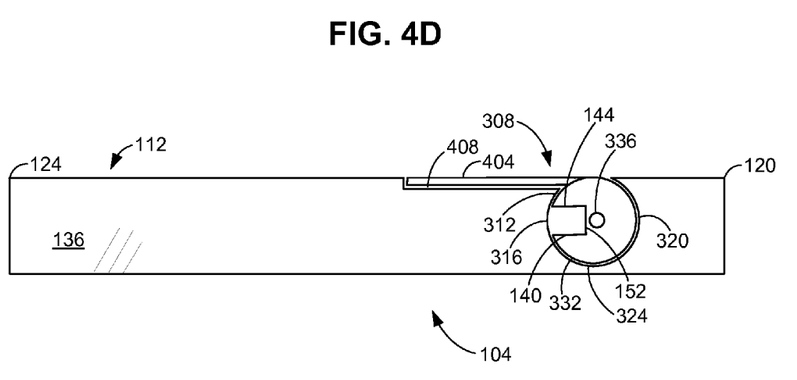
FIG. 4D is a cross sectional view of an exemplary tray table with rotatable support in operation.
Figure 4E:
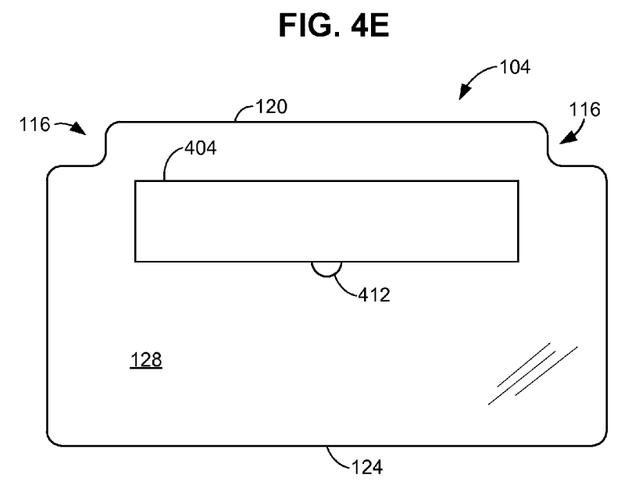
FIG. 4E is a top view of an exemplary tray table with rotatable support in operation.

FIGS. 4C-4E illustrate another rotatable assembly 308 in operation. As can be seen, an elongated tab 404 extends from the body 332 of the rotatable assembly. The elongated tab 404 may be an elongated member, planer structure, or the like which extends from the body 332. In operation, a bottom portion of an electronic device may be placed in the support 108 while an upper portions is propped up against (i.e., held by) the tab 404. This can be seen from FIG. 4C, which illustrates the rotatable assembly 308 in an open position.

FIGS. 4D-4E illustrate the rotatable assembly 308 in a closed position. In one or more embodiments, the body 136 of the tray table 104 may have a recess 408 formed therein to accept the tab 404. In this manner, when closed, the rotatable assembly's tab 404 is positioned flush with the top surface 112 of the tray table 104. This prevents the rotatable assembly 308 from obstructing use of the tray table and provides a planar surface for placement of one or more items. In addition, as can be seen from FIGS. 4D-4E, the tab 404 also encloses the compartment 312 preventing dirt and debris from entering. A cutout or recess 412 may be provided to allow the tab 404 to be lifted in some embodiments.

Though shown in a compartment 312 having a bottom 324, it is noted that a bottom need not be provided in all embodiments having a rotatable assembly 308. For instance, as described above, the compartment 312 may have an open bottom to allow dirt and debris to exit the compartment. Alternatively, one or more openings may be formed in the bottom 324, such as described above with regard to FIG. 3B, to allow dirt and debris to exit the compartment 312.

Figure 5A:
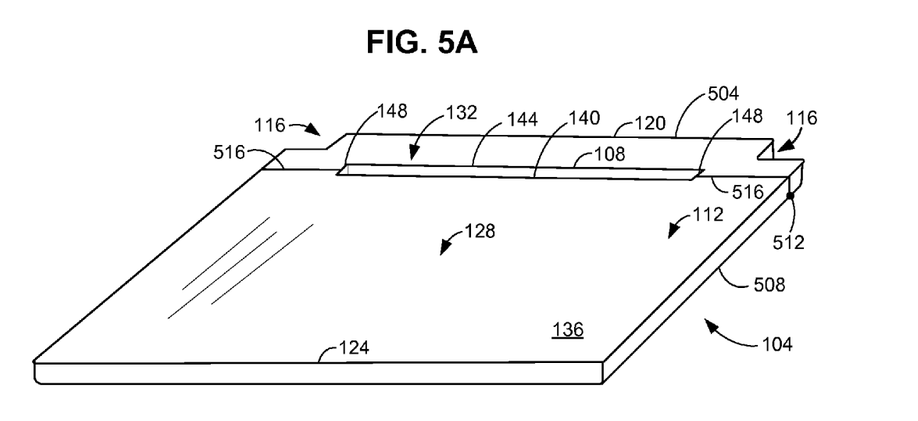
FIG. 5A is a top perspective view of an exemplary tray table with support having separable portions.
Figure 5B:
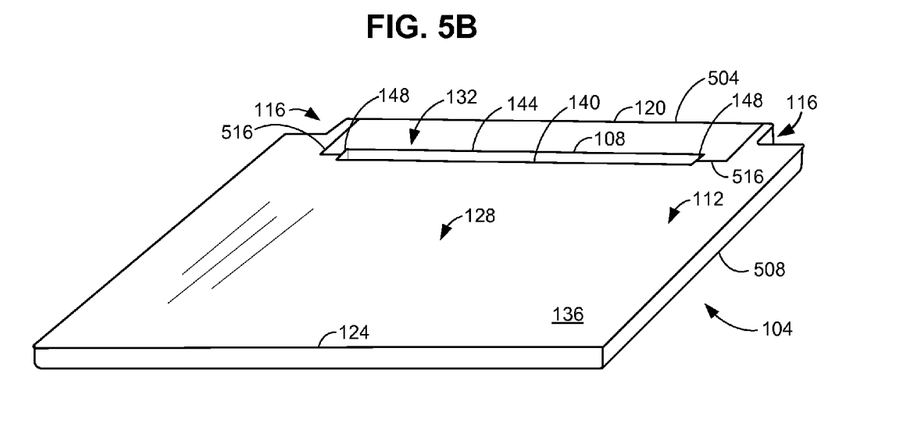
FIG. 5B is a top perspective view of an exemplary tray table with support having separable portions.
Figure 5C:
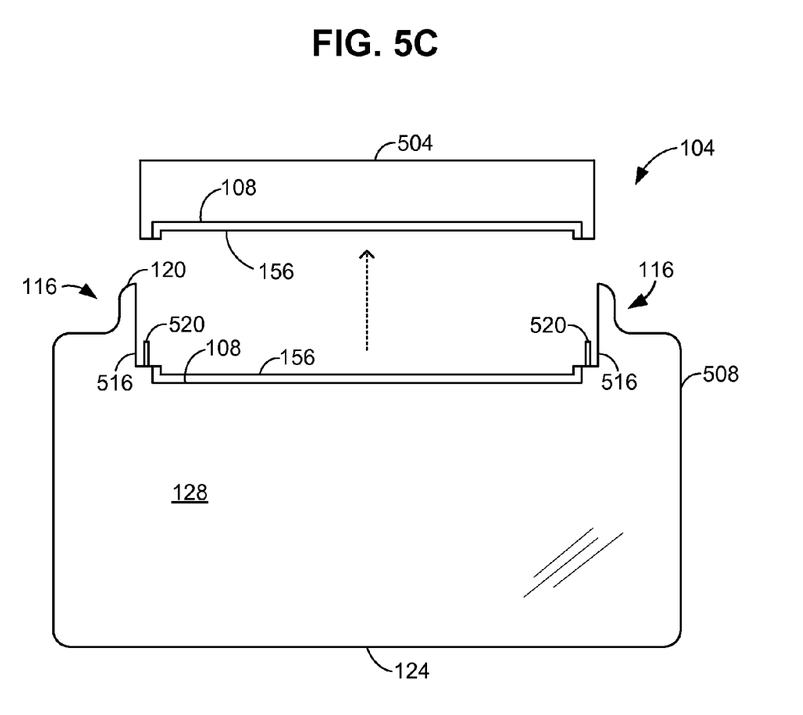
FIG. 5C is a top view of an exemplary tray table with support having separable portions in use.

It is contemplated that some embodiments of the tray table 104 may comprise movable or removable portions to allow for cleaning and maintenance. Referring to FIGS. 5A-5C for example, a first portion 504 of the tray table 104 may be configured to separate from a second portion 508 of the tray table at one or more separations 516. In one or more embodiments, the two portions 504, 508 may meet at or near the support 108. In this manner, the two portions 504, 508 would be separable at or near the support, such as shown. Once separated, access to an interior portion of the support 108 is more easily achieved, such as to clean or maintain the support 108 or any elements associated with the support (such as adjustable elements).

One or more fasteners 512 may be used to allow the first portion 504 and second portion 508 to removably attach to one another. For example, as shown, the tray table 104 may comprise one or more hinges that allow the first and second portions 504, 508 to fold relative to one another, thereby providing access to an interior portion of the support 108. It is contemplated that the hinge may include a biasing mechanism and or locking mechanism to hold the first and second portions 504, 508 in a planar configuration (such as shown in FIG. 5A) during use. One or more additional fasteners 512 such as screws, pins, claps, magnets or the like may also or alternatively be used to hold the first and second portions 504, 508 in the planer configuration.

Alternatively, the first and second portions 504, 508 may be completely separable form one another, such as in the embodiments of FIGS. 5B-5C. For example, the first and second portions 504, 508 may be configured to pull apart when detached from one another. FIG. 5C illustrates the tray table 104 having its first and second portions 504, 508 separated from one another.

It is noted that the first and second portions 504, 508 may comprise mating surfaces or structures that secure the first and second portions together when connected. For example, the first and second portions 504, 508 may have grooves, slots, tabs, or the like that correspond to one another. Also, as stated above above, one or more additional fasteners may be used to secure the first and second portions 504, 508 in a planar configuration. As shown in FIG. 5C for example, one or more pins 520 may connect and secure the first and second portions 504, 508 together when assembled.

It is contemplated that, when mounted to an aircraft passenger seat, only the first or second portion 504, 508 would be attached to the tray table support arms of the seat. This permits the first and second portions 504, 508 to be removable from one another (such as to clean or maintain the support 108) without removing the tray table 104 from the seat. Alternatively, both the first and second portions 504, 508 may be attached to the tray table support arms, such as to secure the first and second portions together in a planar configuration. In such case, additional fasteners for holding the first and second portions together need not be used.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A tray table for an aircraft passenger seat comprising:
    a tablet device;
    a planar body having a top surface for supporting one or more items;
    a thin elongated cavity in the planar body for receiving only an edge of the tablet device, the thin elongated cavity comprising:
        a front wall;
        a back wall, wherein the distance between the front wall and the back wall is substantially the same as a thickness of the tablet device, the thickness being the distance between a front side and back side of the tablet device;
        two side walls extending between the front wall and the back wall; and
        a bottom;
        wherein at least the back wall is angled toward a back end of the tray table; and
        wherein the edge of the tablet device contacts the front wall and the back wall of the thin elongated cavity when received within the thin elongated cavity, and contact with the front wall and the back wall supports the tablet device at an upright position relative to the planar body of the tray table;
    wherein the tray table is attached to one or more tray table support arms of the aircraft passenger seat at one or more mounting points at the back end of the tray table.

2. The tray table of claim 1, wherein the thin elongated cavity is at a back end of the tray table.

3. The tray table of claim 1 further comprising one or more openings at the bottom of the thin elongated cavity to allow dirt or debris to exit the thin elongated cavity.

4. The tray table of claim 1, wherein the thin elongated cavity has an "L" shaped cross section.

5. The tray table of claim 1, further comprising a rotatable body mounted within a cavity of the planar body of the tray table via one or more axels, wherein the thin elongated cavity is formed in the rotatable body.

6. The tray table of claim 1 further comprising a cover configured to cover the thin elongated cavity to prevent entry of dirt or debris into the cavity.

7. The tray table of claim 1, wherein the tray table comprises a first and second portion held together by one or more pins, the first and second portion being separable along the axis of the thin elongated cavity to provide improved access to the cavity for cleaning or maintenance.

8. An aircraft tray table and tablet device combination comprising:
    a tablet device;
    a body having a top surface for supporting one or more items;
    a thin elongated cavity in the top surface of the body, the thin elongated cavity extending laterally across the body and having an opening to receive only an edge of the tablet device in the thin elongated cavity, the thin elongated cavity comprising:
        a front wall;
        a back wall; and
        a bottom;
        wherein a distance between the front wall and the back wall is substantially the same as a thickness of the tablet device such that the tablet device is held upright by the front wall and the back wall when the edge of the tablet device is received in the thin elongated cavity; and
    one or more mounting points at which the aircraft tray table is attached to one or more tray table support arms of an aircraft passenger seat.

9. The aircraft tray table of claim 8, wherein the aircraft tray table comprises a first and second portion held together by one or more pins extending therebetween, and separable along the axis of the thin elongated cavity to provide improved access to the cavity for cleaning or maintenance.

10. The aircraft tray table of claim 8 further comprising one or more openings at a bottom end of the thin elongated cavity to allow dirt and debris to exit the thin elongated cavity.

11. The aircraft tray table of claim 8, further comprising a rotatable body mounted within a cavity of the body of the aircraft tray table via one or more axels, wherein the thin elongated cavity is formed within the rotatable body.

12. A method of providing inflight entertainment at an aircraft tray table and tablet device combination comprising:
    providing a tablet device;
    providing a tray table for holding the tablet device at one or more passenger seats, the tray table comprising a thin elongated cavity extending laterally across the tray table, the thin elongated cavity sized to receive only an edge of the tablet device at a top surface of the tray table, wherein a distance between a front wall and a back wall of the thin elongated cavity are substantially the same as a thickness of the tablet device so as to support the tablet device at an upright position when the tablet device is received within the thin elongated cavity;
    receiving an edge of the tablet device in the thin elongated cavity;
    supporting the tablet device in the thin elongated cavity at an upright position relative to the top surface of the tray table with the front wall and the back wall of the thin elongated cavity; and
    providing access to inflight entertainment to a passenger via a data connection with the tablet device.

13. The method of claim 12 further comprising separating a first portion of the tray table from a second portion of the tray table at the thin elongated cavity to clean or maintain an interior portion of the thin elongated cavity.

14. The method of claim 12 further comprising folding a first portion of the tray table relative to a second portion of the tray table at the thin elongated cavity to clean or maintain an interior portion of the thin elongated cavity.

15. The method of claim 12 further comprising enclosing the thin elongated cavity with a cover when the tablet device is removed from the cavity.

16. The method of claim 12, wherein the thin elongated cavity is formed in a rotatable assembly of the tray table and the tablet device is supported at various non-perpendicular angles by the passenger rotating the tablet device.

* * * * *